United States Patent [19]

Tanaka et al.

[11] Patent Number: 4,780,780
[45] Date of Patent: Oct. 25, 1988

[54] MAGNETIC HEAD

[75] Inventors: Yasuo Tanaka, Nagaoka; Tetsuya Iwata, Yunotani, both of Japan

[73] Assignee: Alps Electric Co., Ltd., Japan

[21] Appl. No.: 374,035

[22] Filed: May 3, 1982

[30] Foreign Application Priority Data

May 1, 1981 [JP] Japan .............................. 56-63704[U]

[51] Int. Cl.⁴ ............................................. G11B 5/265
[52] U.S. Cl. .................................... 360/125; 360/121; 29/603
[58] Field of Search ............... 360/119, 120, 121, 125; 29/603

[56] References Cited

U.S. PATENT DOCUMENTS

| 2,592,652 | 4/1952 | Buhrendorf | 360/119 |
| 3,584,375 | 6/1971 | Gingerich et al. | 360/121 |
| 3,964,103 | 6/1976 | Thompson et al. | 360/129 |
| 4,152,742 | 5/1979 | Kronfeld | 360/125 |
| 4,293,884 | 10/1981 | Schiller | 360/125 |

Primary Examiner—Robert S. Tupper
Attorney, Agent, or Firm—Guy W. Shoup; Paul J. Winters

[57] ABSTRACT

In a magnetic head having front cores and a rear core, the front cores are held between leg portions of the U-shaped rear core owing to the resiliency of the rear core.

1 Claim, 4 Drawing Sheets

MAGNETIC HEAD

BACKGROUND OF THE INVENTION

The present invention relates to a magnetic head. More particularly, it relates to a magnetic head for use in a digital recording device such as a flexible disk.

In a prior-art magnetic head of the specified type, front cores and a rear core are typically joined by the use of a resin. As will be discussed in detail later, joining of the cores by a resin leads to disadvantages including a poor assembling job efficiency and inferior electrical characteristics.

SUMMARY OF THE INVENTION

An object of the present invention is to provide a magnetic head which can be readily assembled and which exhibits good electrical characteristics.

The present invention consists in a magnetic head which includes front cores and a rear core, said front and rear cores being joined by utilizing the resiliency of said rear core.

BRIEF DESCRIPTION OF THE DRAWINGS

FIGS. 1 to 3 illustrate a prior-art magnetic head, in which

FIG. 1 is an exploded perspective view of the magnetic head,

FIG. 2 is a perspective view thereof, and

FIG. 3 is a front plan view thereof as seen from the side to be held in a sliding contact with the recording medium, and FIGS. 4(a) to 6 illustrate a magnetic head according to the present invention, in which FIGS. 4(a) and 4(b) are a front view and a side view of a rear core respectively, FIG. 6 is an exploded perspective view of the magnetic head.

DETAILED DESCRIPTION OF THE INVENTION

Figure 1:
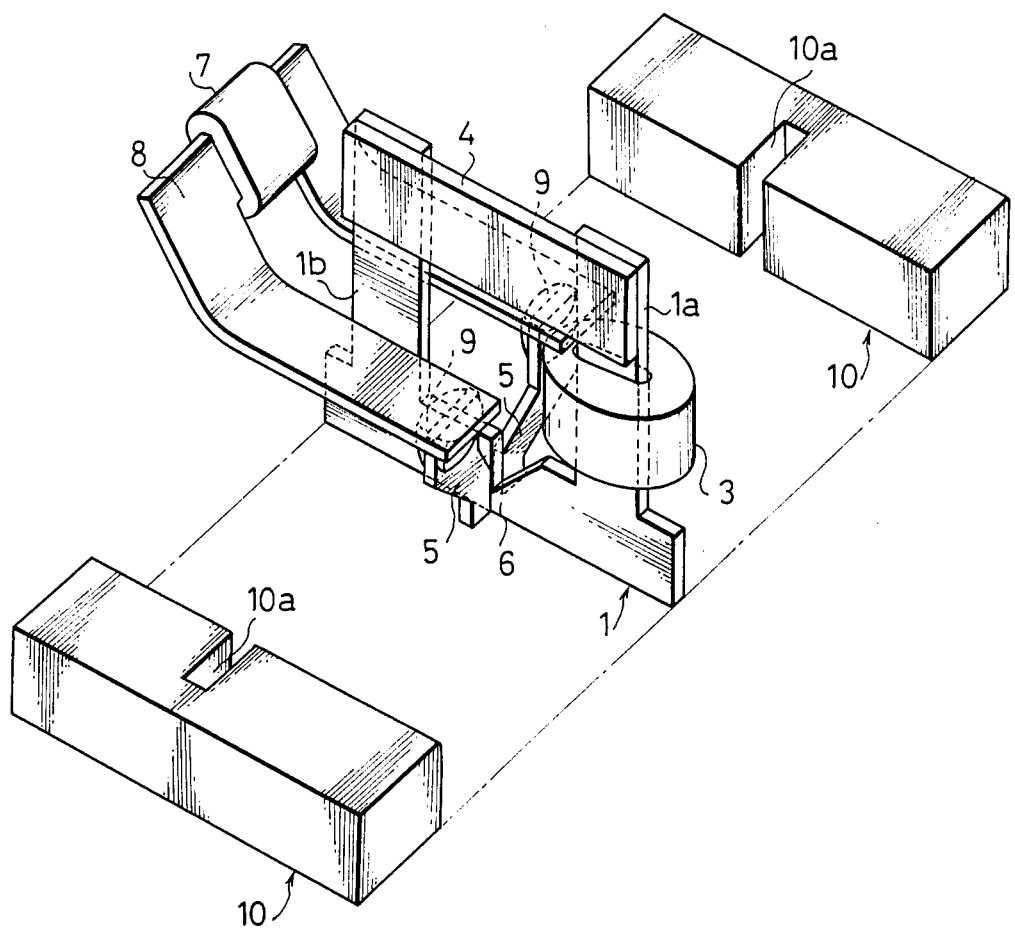
Figure 2:
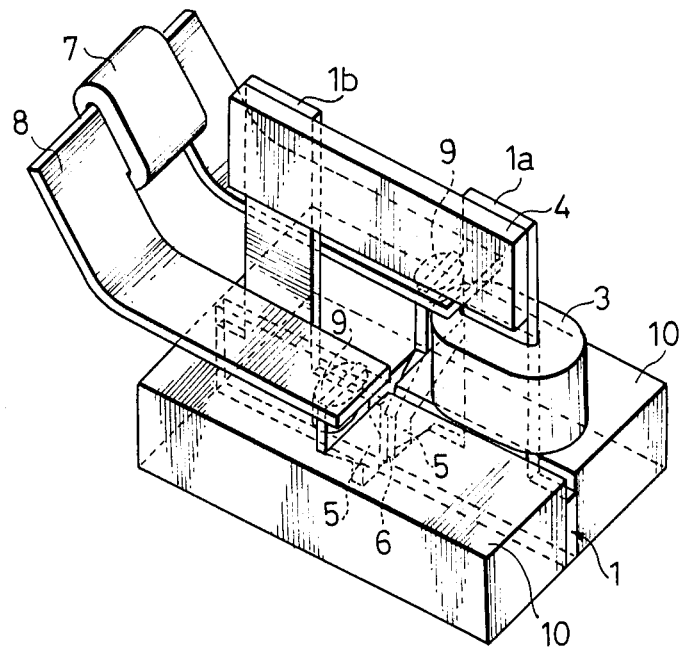
Figure 3:
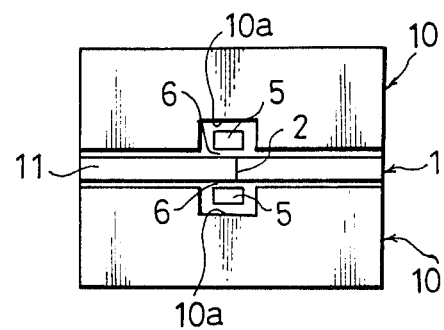
Figure 4A:
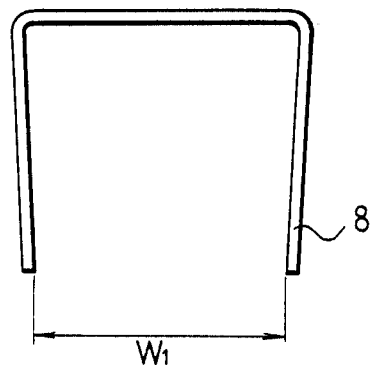
Figure 4B:
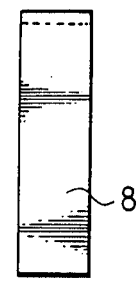
Figure 5A:
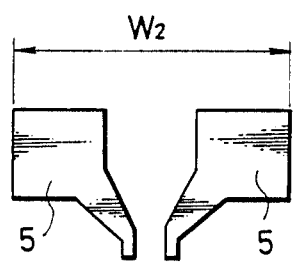
FIGS. 5(a) and 5(b) are a front view and a side view of erasing front cores respectively.
Figure 5B:
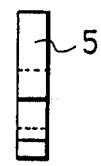
Figure 6:
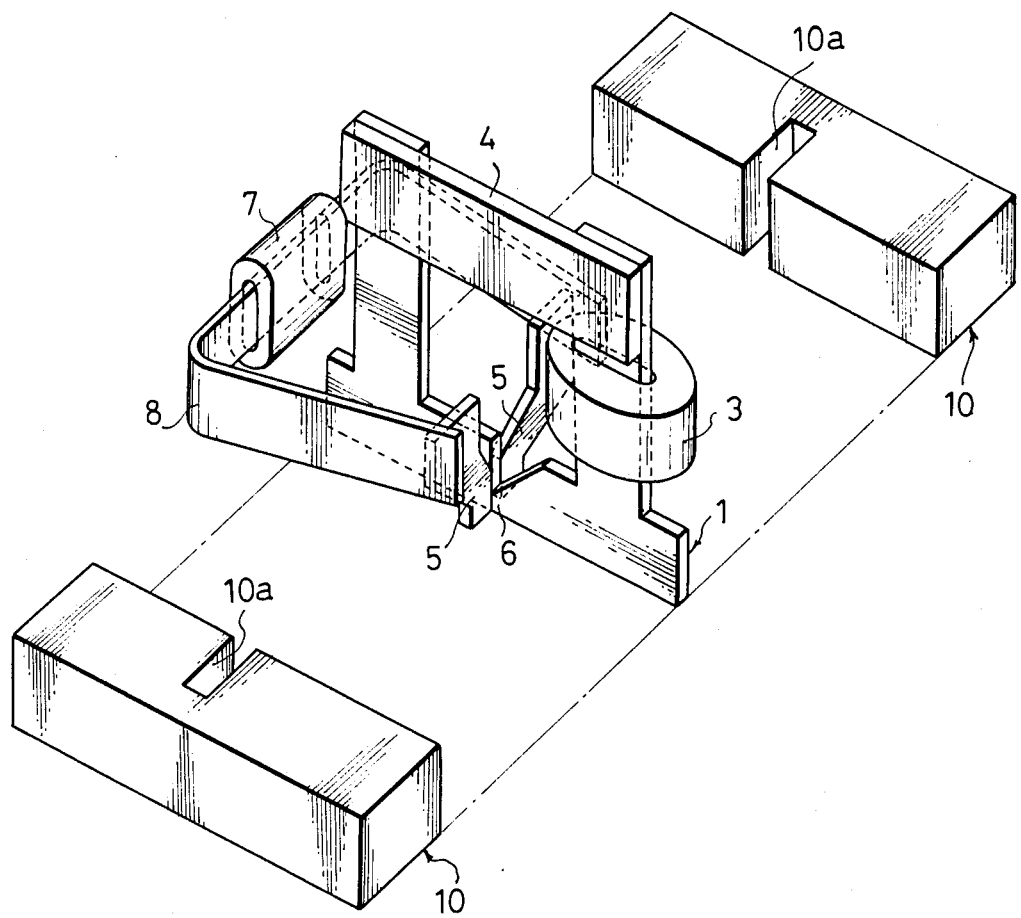

Heretofore, a magnetic head for use in a digital recording device has been constructed as shown in FIGS. 1 to 3. Referring to the figures, numeral 1 designates a recording/reproducing core which is formed with a recording/reproducing gap 2 in advance. A coil 3 for recording and reproduction is wound around one leg portion 1a of the core 1, while a strip-like rear core 4 is connected to both leg portions 1a and 1b. Numerals 5 designate erasing front cores which are juxtaposed on both sides of the recording/reproducing core 1. Erasing gaps 6 are formed between the cores 5 and the recording/reproducing core 1. A U-shaped rear core 8 on which an erasing coil 7 is wound is placed on the rear end parts of the erasing front cores 5. The U-shaped rear core 8 is joined to the front cores 5 with a resin indicated at numerals 9. Shown at numerals 10 are face plates which are made of a ceramic or the like and which are provided with groove portions 10a for receiving the corresponding erasing front cores 5. In operation, a signal current is caused to flow through the coil 3 and is magnetically recorded in the recording/reproducing gap 2. At the same time, current is caused to flow through the coil 7 so as to induce erasing magnetic fields in the erasing gaps 6 of the erasing front cores 5, thereby to control the width of a recorded track into a desired value.

In the magnetic head of the prior-art structure, however, the resin 9 is employed for joining the erasing front cores 5 and the U-shaped rear core 8, and this measure has led to disadvantages as stated below. First, it takes a long period of time for the resin 9 to harden. During this time period, the erasing front cores 5 and the rear core 8 need to be held together. This increases the number of assembling steps and necessitates a jig or components for holding them together. Therefore, the prior-art magnetic head is very inferior in the assembling job efficiency, cannot be easily mass produced and becomes high in cost. Furthermore, even when the holding jig or components is/are used, it is difficult to keep the cores together with the necessary precision, and the magnetic reluctances of the joined portions may increase, so that a satisfactory erasing characteristic is difficult to attain. Besides, the dispersion of the electrical characteristics of the finished articles of the magnetic head may be large.

The present invention intends to eliminate the disadvantages of the prior art and to provide a magnetic head of easy assemblage and good electrical characteristics. Hereunder, an embodiment of the invention will be described with reference to FIGS. 4(a) to 6. A rear core 8 which is made of a magnetic material such as permalloy and which is to be joined with erasing front cores 5 is formed into the shape of the letter U by bending an elongate thin plate of the magnetic material. The spacing $W_1$ between the end parts of the rear core 8 is made smaller than the outside width $W_2$ of the two erasing front cores 5 in advance. The front cores 5 and the rear core 8 are joined together in such a manner that the erasing front cores 5 are held between the leg portions of the U-shaped rear core 8 owing to the resiliency of this rear core. The remaining construction of the embodiment is similar to that of the prior-art magnetic head, and will be omitted from the description by assigning the same symbols to the same parts.

As set forth above, according to the present invention, the erasing front cores 5 and the rear core 8 are joined by the resiliency of the latter 8. Therefore, the joint between both the cores is more reliable than in the prior art employing the resin 9 and is continuously kept. This brings forth the remarkable effects that the assemblage is easy and that good and stable electrical characteristics can be attained.

We claim:

1. In a recording head for recording information in a magnetic medium, including means including a recording core defining a recording gap for recording information magnetically in a recording medium passing said recording gap, and means including an erasing core arranged generally orthogonally to said recording core to define erasing gaps on respective sides of said recording gap for narrowing the track of information recorded on said recording medium, said erasing core including front core portions arranged along said recording gap and a rear core portion having a generally U-shape to form respective end portions contacting each said front core portions, the improvement wherein said rear core is formed of a resilient material bent to space said end portions, when unstressed, a distance less than the width of said front core portions and said rear core is held to said front cores by spreading said end portions to grip said front cores therebetween.

* * * * *